United States Patent [19]

Infanger

[11] Patent Number: 5,302,156
[45] Date of Patent: Apr. 12, 1994

[54] CHAIN DRIVE

[75] Inventor: Rudolf Infanger, Hinwil, Switzerland

[73] Assignee: Ferag AG, Hinwil, Switzerland

[21] Appl. No.: 961,141

[22] Filed: Oct. 14, 1992

[30] Foreign Application Priority Data

Nov. 6, 1991 [CH] Switzerland .............. 03-231/91

[51] Int. Cl.⁵ .......................................... F16H 7/00
[52] U.S. Cl. ...................... 474/148; 474/900;
74/114; 198/684; 271/264
[58] Field of Search .............. 474/160, 71, 83, 131,
474/148, 152, 900; 198/835, 838, 683-685;
271/6, 7, 12, 198, 264; 74/113, 114

[56] References Cited

U.S. PATENT DOCUMENTS

| | | | |
|---|---|---|---|
| 3,575,282 | 4/1971 | Gaiotto et al. | 198/683 |
| 3,637,067 | 1/1972 | Wright | 198/685 |
| 3,902,376 | 9/1975 | Humphrey | 474/71 |
| 3,915,293 | 10/1975 | Melchiorre et al. | 271/198 X |
| 4,059,022 | 11/1977 | Fawcett et al. | 474/131 |
| 4,294,345 | 10/1981 | Stauber et al. | 198/685 X |
| 4,351,637 | 9/1982 | Dixon | 198/838 X |

FOREIGN PATENT DOCUMENTS

| | | |
|---|---|---|
| 0274751 | 7/1988 | European Pat. Off. . |
| 3545300 | 6/1987 | Fed. Rep. of Germany . |
| 588647 | 6/1977 | Switzerland . |

*Primary Examiner*—Ramon S. Britts
*Assistant Examiner*—Roger J. Schoeppel
*Attorney, Agent, or Firm*—McCormick, Paulding & Huber

[57] ABSTRACT

The chain drive described in the present disclosure, instead of using a single sprocket wheel, saves space by making use of two or more sprocket wheels coupled together by slip-free means, each sprocket wheel having only a small number of low sprockets. The number of sprocket wheels, the center-to-center distance between the sprocket wheels, the tip diameter of the sprocket wheels, and the phase offset of the sprockets as between the sprocket wheels which form a set of such wheels are all so matched that one sprocket of one sprocket wheel always engages in the chain in rhythmical sequence, so that all the sprocket wheels rotate smoothly when the chain moves evenly.

13 Claims, 4 Drawing Sheets

CHAIN DRIVE

BACKGROUND OF THE INVENTION

The present invention relates to drives, in particular to chain drives in which a chain is used to drive sprockets or wheels is driven by sprocket wheels.

PRIOR ART

For the transport of printed products, driven chain conveyors are often used which, for example, have a mechanically controlled clamp on each link of the chain to grip and transport a printed product. Such chains are described, for example, in the present applicant's U.S. Pat. No. 4,294,345. If ancillary devices are fitted within the effective transport length of a conveyor that uses such a chain and run at a rate whereby the number of printed products per unit time corresponds to the conveyor's speed, it is advantageous to drive these by a driven chain. For example, such an ancillary device might be a counter and control unit, as described in the present applicant's Swiss Patent application 3231/90.

In this prior art, such an ancillary device is driven by a sprocket wheel which is so located in relation to the chain conveyor that the sprockets engage in the chain and the wheel is driven by the chain. To ensure a smooth rotary motion of such a driven sprocket wheel, one sprocket must always engage in the chain. This is achieved by making the chain loop partly around the wheel by a certain minimum angle or, in the case of a chain running in a straight line, by having a sprocket wheel with a certain minimum number of sprockets or correspondingly tall sprockets.

To be driven smoothly by a chain conveyor such as those referred to above, a sprocket wheel must be about 300 mm in diameter when the links are about 100 mm long, as is usual for such chains. The large amount of space that such a driven wheel requires is an obvious disadvantage.

SUMMARY OF THE INVENTION

The present invention has set itself the task of designing a chain drive, particularly a driven chain for use with a chain conveyor for the transport of printed products, that requires less space than a corresponding chain drive made in accordance with prior art. The driven wheel must move evenly.

The chain drive of this invention makes use of a number k of several sprocket wheels coupled together, each having a small number z of low sprockets of height h, whereby each such wheel can have a small diameter but need not engage a link pin in every position of rotation. When such a wheel is driven by a chain, it does not move evenly. The sprocket wheels of the present invention are shaped and arranged in such a way that one sprocket of one of the wheels always engages in the chain. Because the wheels are coupled together, they all turn in unison, but only one at a time is being driven in a rhythmical sequence. An ancillary device can, for example, be driven by means of the shaft of one of the sprocket wheels or by a direct take-off from the means used to couple the sprocket wheels together.

The driven chain described in the present disclosure can be used without further gearing to produce a very high speed of rotary motion in relation to the speed of the chain, expressed as a number of links per unit time. For example, the counter and control unit referred to above, Swiss Patent application 3231/90, could be driven in this manner without further gearing, for example by an impeller wheel having two, three, or four impellers, which would require one revolution for every two, three, or four chain links respectively. This is a further advantage of a driven chain as described in the present disclosure.

Though the preferred use of the chain drive described in this disclosure is as a driven chain, it can also be used as a driving chain.

Typical embodiments of the invention proposed by the present disclosure described in detail by reference to the drawings, as follows:

DESCRIPTION OF THE PREFERRED EMBODIMENTS

Figure 1:
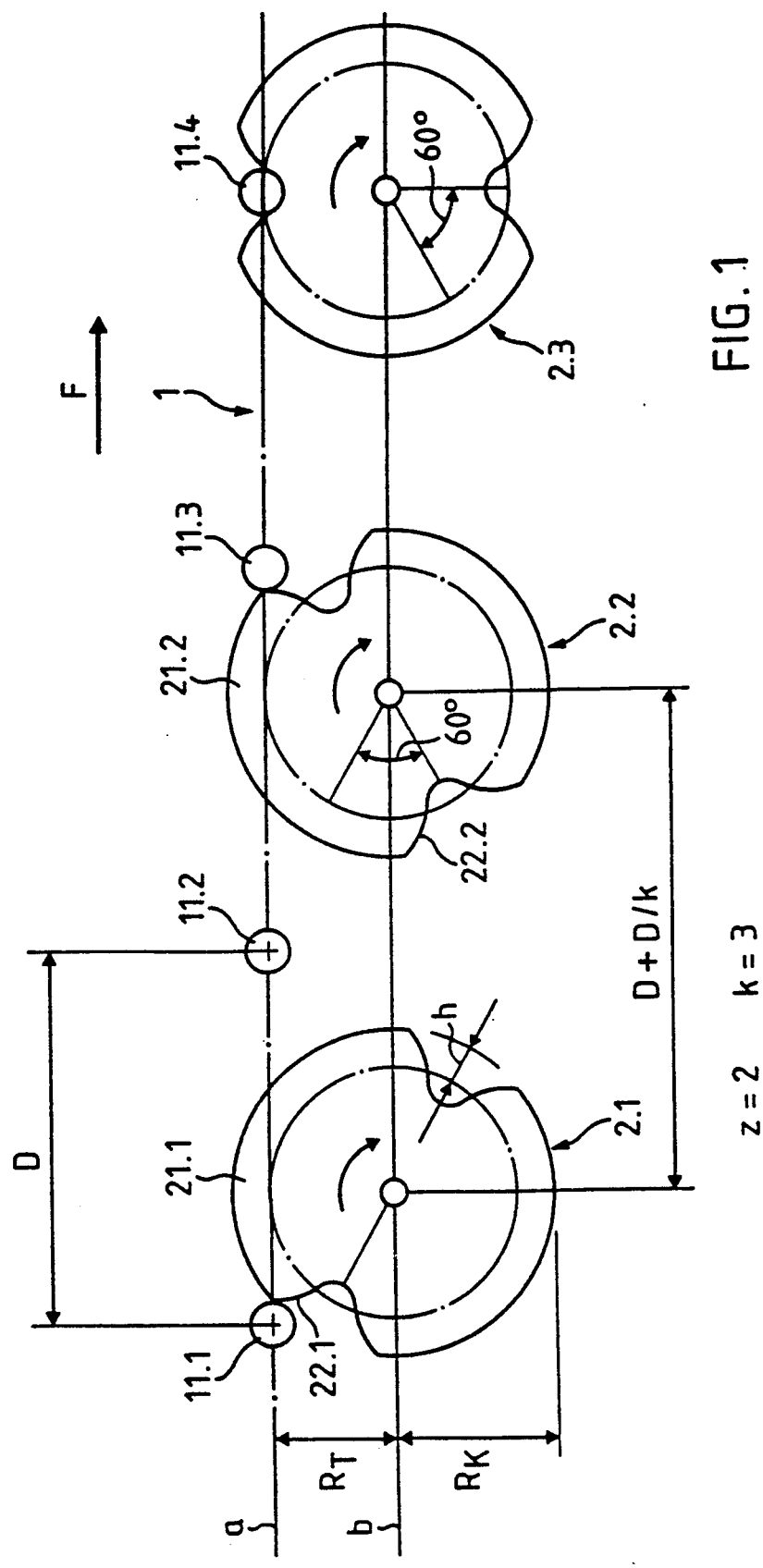
FIG. 1 is a diagrammatic representation of a first typical embodiment of the chain drive described in the present disclosure, as viewed perpendicular to the chain's direction of motion.

FIG. 1 is a diagrammatic representation of a typical embodiment of the chain drive described in the present disclosure. It shows a chain 1 with link pins 11.1, 11.2, 11.3, 11.4 placed at a constant interval D to one another. Further, it has a number k=3 of sprocket wheels 2.1, 2.2, 2.3, each of which has z=2 sprockets.

The centerlines of the sprocket-wheel axles are perpendicular to the chain's direction of motion F and lie in a plane b parallel to plane a in which lie the centerlines of the link pins. The distance between plane a of the link-pin centerlines and plane b of the centerlines of the sprocket-wheel axles is equal to the radius $R_T$ of the circular arc formed by the sprocket wheels, each arc having a circumference zD. The center-to-center distance between the sprocket wheels is D (n+1/k), where n is 0 or any integer, such as 1, 2, 3, 4. For the embodiment shown in figure 1, the center-to-center distance is D+D/k (n=1). The wheels 2.1, 2.2, 2.3 are so placed that their sprockets have a phase offset relative to one another. The phase offset from each wheel to the next is 360°/zk. The tip diameter $R_K$ of the sprocket wheels is chosen to provide an overlap of 1/k, i.e. each sprocket engages a link pin during part of the wheel's revolution that amounts to 360°/zk. In FIG. 1 this is equal to an angle of 60°.

When chain 1 moves smoothly in direction F, indicated by an arrow, the link pin 11.1 moves along the leading edge 22.1 of sprocket 21.1 of the sprocket wheel 2.1 and drives the wheel 2.1 in the direction indicated by the arrow until the link pin 11.1 rolls off the edge 22.1 into the gap between the two sprockets. In the case of a tip circle that produces an overlap of 1/k, this means that the circular arc described along the centerline of the chain has a developed length of D/k and the wheel turns by an angle of 360°/zk. Because the three sprocket wheels are coupled together, wheel 2.1 drives the wheels 2.2 and 2.3 by the same amount. The second sprocket wheel 2.2 is so arranged that its sprockets turn with a phase offset 360°/zk relative to the first sprocket wheel 2.1, hence the link pin 11.2 starts to engage the leading edge 22.2 of sprocket 21.2 of wheel 2.2 when all three wheels have turned through an angle of 60° relative to the position shown in the figure and turns the wheel through another 60°. On completion of this movement, link pin 11.3 drives the sprocket wheel 2.3 in its turn, again through 60°.

In other words, because all the wheels are coupled together, the sprocket wheels turn through 180° when the chain moves a distance D. This results in a revolution count or speed U of one revolution for every two chain links, i.e. $U = v/Dz$, where v is the speed of the chain.

As the means of coupling together the movement of the three sprocket wheels, a chain, a gear system, or some other slip-free means of coupling may be used.

Figure 2:
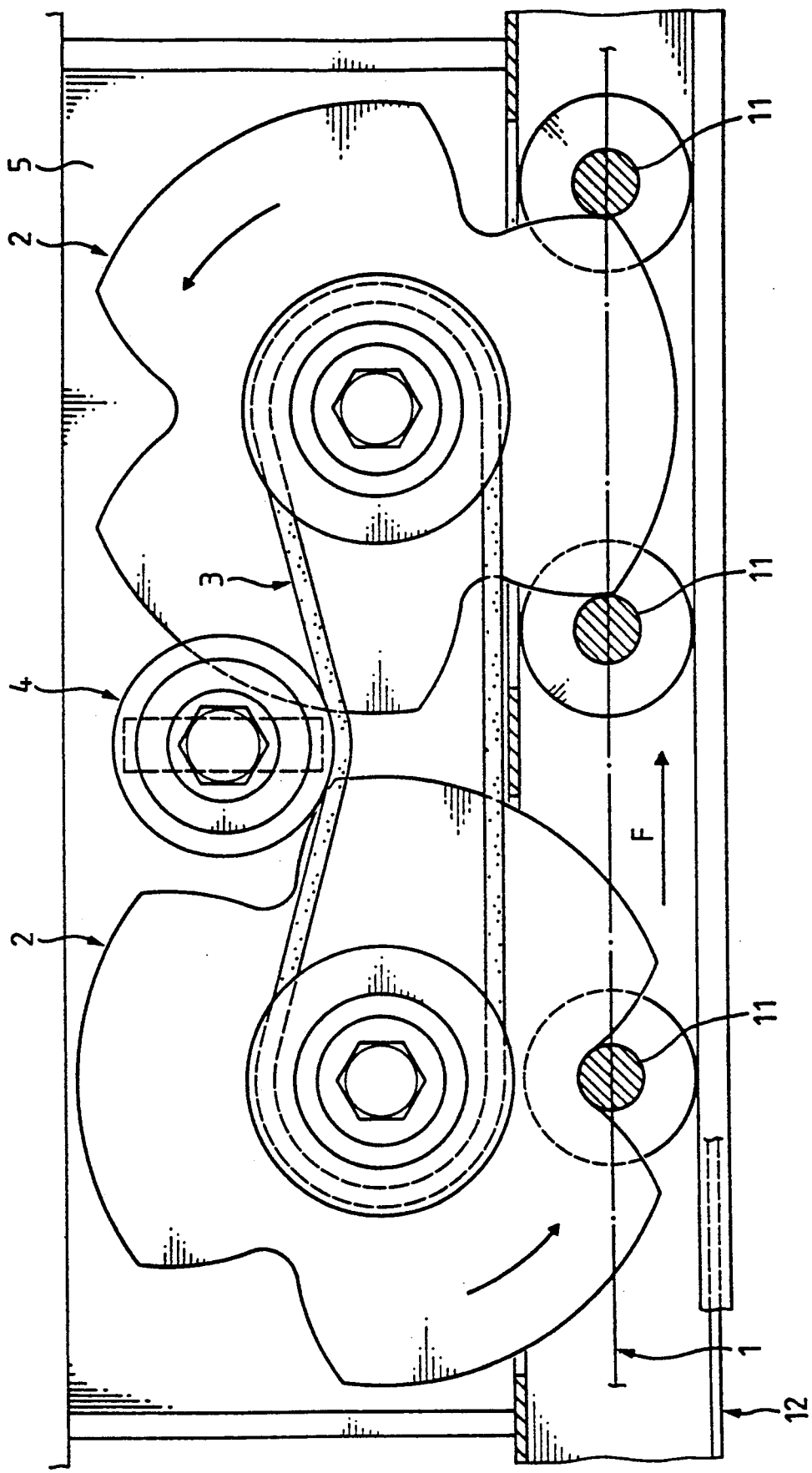
FIG. 2 is a detailed view of a second typical embodiment of the chain drive described in the present disclosure, as viewed perpendicular to the chain's direction of motion.
Figure 3:
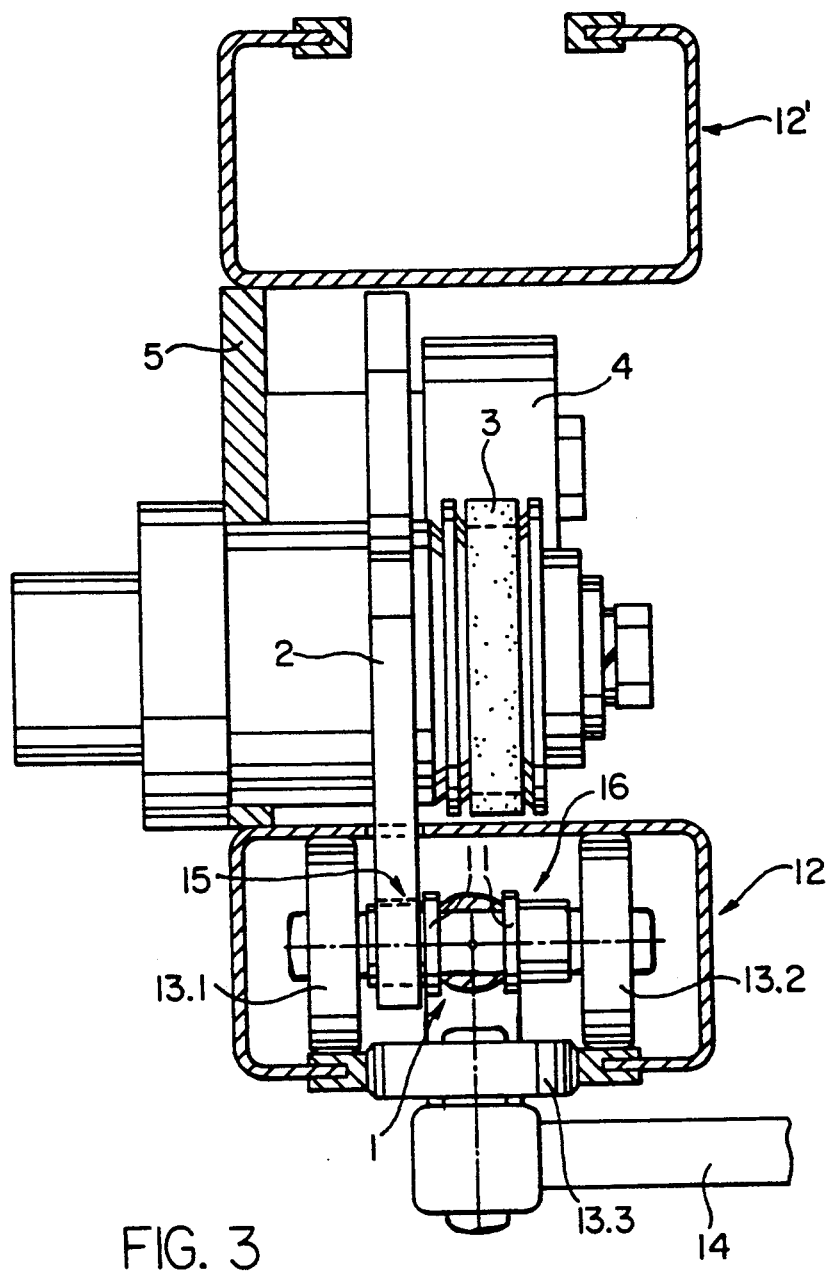
FIG. 3 is a further view of the embodiment shown in FIG. 2, but as viewed parallel to the chain's direction of motion.

FIGS. 2 and 3 show details of a further typical embodiment of the chain drive described in the present disclosure; namely in elevation in FIG. 2, viewed perpendicular to the chain's direction of motion, and in section in FIG. 3, viewed parallel to the chain's direction of motion. The chain drive shown has two sprocket wheels $k=2$, each having three sprockets $z=3$. By contrast with the embodiment shown in FIG. 1, in this case the sprocket wheels are above the chain.

The chain 1 runs in a channel 12 and again has link pins 11 that engage in the sprocket wheels 2. The sprocket wheels 2 are coupled together by a toothed belt 3 kept tensioned by a tensioning pulley 4. The sprocket wheels 2 and the tensioning pulley 4 are held in bearings on a carrier plate 5. As shown in FIG. 3, the carrier plate 5 may be placed between the channel 12 of the chain's forward-motion section and channel 12' of its return section, whereby the space required by the whole of the chain drive becomes particularly compact.

The chain shown in FIG. 3 has pairs of running wheels 13.1 and 13.2 which run in the channel 12 that holds the chain. The link pins 11 act as joint axles for the pairs of running wheels as shown more particularly in applicant's U.S. Pat. No. 4,294,345. Each link pin 11 has a central ball-and-socket joint (not shown) which is also connected to a guide wheel 13.3 that runs in a slot along the length of the channel 12. The clamp for gripping a printed product (not shown) is attached to an arm 14 outside the channel 12.

Figure 4:
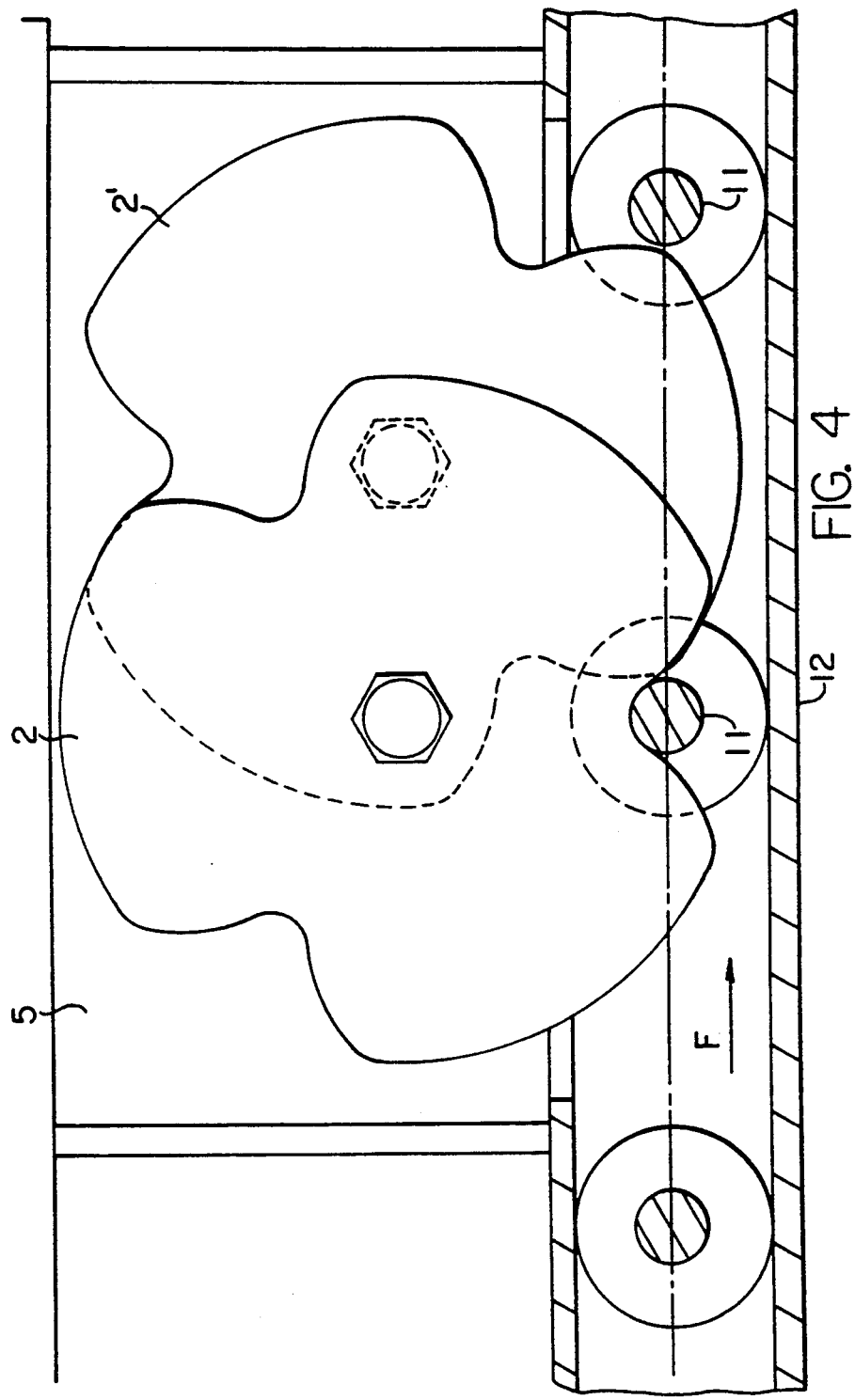
FIG. 4 is a view of a third embodiment of the chain drive as viewed perpendicular to the chain's direction of motion.

As shown in FIG. 3, the sprocket wheels 2 can engage the link pin 11 either of in two positions 15 and 16. The link pins 11 should preferably be surrounded by rollers in these positions. In the embodiment shown in FIGS. 2 and 3, the two sprocket wheels 2 are placed behind each other approximately in the same plane in the direction of motion. A still more compact embodiment is obtained if the two sprocket wheels are placed at a center-to-center distance of only D/k, that is (n=0), staggered side by side, as shown in FIG. 4 so that the sprockets of one wheel engage the link pin 11 in position 15 and those of the other engage the link pin 11 in position 16. For such an embodiment, gears should preferably be used to couple the sprocket wheels together.

When the edges of the sprockets on the sprocket wheels are symmetrical, as shown, they allow the chain to be used in either direction. If the chain is for use in one direction only, the trailing edge of the sprockets need not have exactly the same shape.

The chain drive as described in the present disclosure for the types of chain shown in FIGS. 2 and 3 is not limited to the transport of printed products, but is suitable for use in appropriate form with any type of chain for any application.

As shown in FIGS. 1 to 3 inclusive, the sprocket wheels of the chain drive described in the present disclosure may be placed either above or below the chain. Subject to a suitable means of guidance and retention for the chain, they may also be placed next to the chain in an approximately horizontal position or in any other position in space.

The sprocket wheels of the chain drive described in the present disclosure can also be used in driving chains that do not run in a straight line. This applies particularly to chains that run in a channel and can thus describe practically any curve. In such a chain drive, the sprocket wheels may be placed in convex curves curving in the opposite sense away from the wheels and/or in concave curves curving in the same sense as the wheels.

I claim:

1. Chain drive comprising:
    a chain made with link pins at constant intervals (D);
    a number (k) of at least two identical sprocket wheels whose axis of rotation is perpendicular to the direction of movement (F) of the chain, each sprocket wheel having a number (z) of sprockets so placed in relation to the chain as to ensure an effective working contact therewith;
    the center-to-center distance between the sprocket wheels being $nD + D/k$, wherein n is zero or any integer;
    the sprocket wheels being connected together by a slip-free coupling means which ensures that they turn in unison at the same speed of rotation when one of them is being driven;
    the sprockets of consecutive sprocket wheels in the feed direction (F) being phase-offset in relation to each other by an angle of 360°/zk; and
    the tip radius ($R_K$) of the sprocket wheels being chosen in such a manner as to ensure an overlap of 1/k.

2. Chain drive in accordance with claim 1, wherein two sprocket wheels, each having three sprockets, are placed at a center-to-center distance of 3D/2 along the chain, whose sprockets have a phase-offset of 60° as between the two sprocket wheels, and the height (h) of the sprockets of the sprocket wheels is such as to ensure an overlap of 0.5.

3. Chain drive in accordance with claim 1, wherein the shape of the leading and trailing edges of the sprockets on the sprocket wheels is symmetrical.

4. Chain drive in accordance with claim 1, wherein the sprocket wheels are placed approximately in the same plane and the center-to-center distance between the sprocket wheels is greater than the tip diameter ($R_K$) of the sprocket wheels.

5. Chain drive in accordance with claim 1, wherein the sprocket wheels are staggered relative to one another in the chain's direction of motion and the center-to-center distance of the sprocket wheels is less than the diameter ($R_K$) of the sprocket wheels.

6. Chain drive in accordance with claim 1, wherein the sprocket wheels are coupled together by means of a toothed belt.

7. Chain drive in accordance with claim 6, wherein the toothed belt (3) between two drive wheels is kept tensioned by a tensioning pulley (4).

8. Chain drive in accordance with claim 1, wherein the chain moves in a channel, the sprocket wheels are attached to a carrier plate and are free to rotate, and the carrier plate fits between the channel of the forward-motion section and the channel of the return section.

9. A chain drive, in accordance with claim 1, on a chain conveyor for printed products, to drive a counter or control device which interacts with each transported printed product.

10. Chain drive in accordance with claim 1, wherein the sprocket wheels are coupled together by means of a chain.

11. Chain drive in accordance with claim 1, wherein the sprocket wheels are coupled together by means of gears.

12. Chain drive in accordance with claim 10 wherein the coupling chain between two drive wheels is kept tensioned by a tensioning pulley.

13. In a chain conveyor which conveys a series of printed products from one point to another, a chain drive comprising:
- a chain made with link pins at constant intervals (D);
- a number (k) of at least two identical sprocket wheels whose axis of rotation is perpendicular to the direction of movement (F) of the chain, each sprocket wheel having a number (z) of sprockets so placed in relation to the chain as to ensure an effective working contact therewith;
- the center-to-center distance between the sprocket wheels being $nD+D/k$, where n is zero or any integer;
- the sprocket wheels are connected together by a slip-free coupling means which ensures that they turn in unison at the same speed of rotation when one of them is being driven;
- the sprockets of consecutive sprocket wheels in the feed direction (F) are phase-offset in relation to each other by an angle of $360°/zk$; and
- the tip radius ($R_K$) of the sprocket wheels being chosen in such a manner as to ensure an overlap of $1/k$.

* * * * *